Feb. 10, 1931.  A. S. FITZ GERALD  1,792,291
PROTECTIVE ARRANGEMENT
Filed Feb. 19, 1929
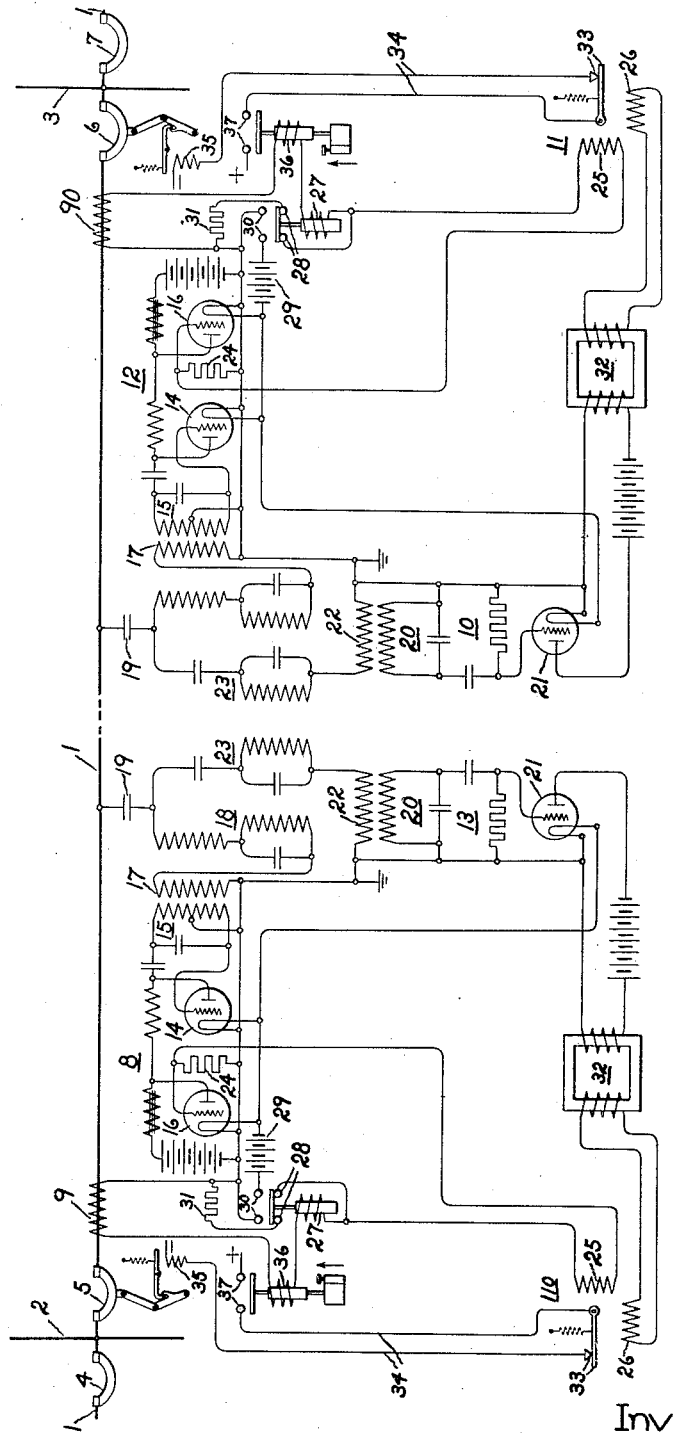
Inventor:
Alan S. FitzGerald,
by Charles E. Tullar
His Attorney.

Patented Feb. 10, 1931

1,792,291

UNITED STATES PATENT OFFICE

ALAN S. FITZ GERALD, OF SCHENECTADY, NEW YORK, ASSIGNOR TO GENERAL ELECTRIC COMPANY, A CORPORATION OF NEW YORK

PROTECTIVE ARRANGEMENT

Application filed February 19, 1929. Serial No. 341,150.

My invention relates to improvements in protective arrangements for electric circuits and more particularly to improvements in protective arrangements for alternating current circuits wherein discriminating action is obtained by comparison of electric characteristics of the circuit at different points thereof by means of carrier current or the like in order to eliminate the use of pilot wires. An object of my invention is to provide an improved protective arrangement whereby to obtain the desired discriminating action under all conditions of faults independently of any directly quantitative relation so as to eliminate discrepancies due to variations in intensity of transmission or reception, attenuation and the like.

My invention will be better understood from the following description when considered in connection with the accompanying drawing and its scope will be pointed out in the appended claims.

The single figure of the accompanying drawing illustrates in a one line diagram, for the sake of clearness, an embodiment of my invention as applied to two points of an alternating current circuit such as a power line conductor 1 which may extend between a plurality of interconnected generating and distributing stations, two of which are illustrated as buses 2 and 3. Three sections of the line 1 are shown, extending two from and one between the stations 2 and 3, the last being shown partly by a broken line to give a concept of distance between the stations. For controlling the circuits of the different sections at the ends thereof, suitable circuit interrupting means such as circuit breakers 4 and 5 on opposite sides of the bus at station 2 and circuit breakers 6 and 7 on opposite sides of the bus at station 3 may be provided so that, on the occurrence of a fault on a section the section can be isolated without interrupting continuity of service on sound sections. Although my invention is herein illustrated in a sectionalized circuit such as a power line feeder and the like, since it has a particular phase of utility where distance between stations is involved, its application is not so limited as it is also adapted to discriminating protection of parallel lines and the like.

In accordance with my invention, I provide means such as thermionic apparatus 8 at one point of the circuit for transmitting a carrier wave of a predetermined frequency and for modulating the carrier wave in accordance with an electrical characteristic of the circuit at the point. This characteristic of the circuit may be, for example, a current in the circuit or a current proportional thereto which may be obtained from the output of suitable transforming means such as a current transformer 9. The carrier wave may be transmitted through space without wires or as a carrier current over the line conductor 1 from the transmitter 8 to means such as a thermionic receiver 10 located at another point of the circuit for demodulating the modulated carrier wave transmitted by the transmitter 8. For controlling the circuit breaker 6 selectively in accordance with the demodulated carrier wave and an electric characteristic of the circuit at the location of the receiver 10, I provide means such as a directional relay 11 which, as shown, is arranged to be actuated in accordance with the relative directions of the circuit current at the ends of the section between the stations 2 and 3, that is, in accordance with the relative directions of the demodulated carrier current and the current in the circuit 1 at the station 3 or a current proportional thereto as provided by a current transformer 90.

In a similar manner the station 3 is provided with a transmitter 12 adapted to transmit a carrier wave having a frequency differing from that transmitted by the transmitter 8 and modulated in accordance with the current in the circuit at station 3, that is, by the potential across the secondary of the current transformer 90. Also station 2 is provided with a receiver 13 adapted to demodulate the carrier wave transmitted by the receiver 12. For controlling the circuit breaker 5, a directional relay 110 is arranged to be actuated in accordance with the relative directions of the demodulated carrier wave and the current in the secondary of the current transformer 9. Similar apparatus may be provided for each circuit breaker in the conductor 1 at every station so that upon the occurrence of a fault in any section the circuit breakers controlling that section are opened and the section is thus isolated.

The transmitters 8 and 12 may be of any suitable type and are herein shown as high frequency devices of a type well known to the art. They include an oscillator element having an oscillator tube 14 and an oscillator circuit 15, the oscillations of which are modulated by a modulator element including a tube 16. The oscillator circuit 15 is coupled to the conductor 1 through an output coil 17 and the high frequency modulated oscillation or carrier wave is transmitted in a manner well known to the art over a suitably tuned stop circuit or wave trap 18 and a condenser 19 to the conductor 1. The receivers 10 and 13 may be of any suitable type and are herein shown as high frequency devices of a type well known to the art. They include a receiving circuit 20 and a rectifier or demodulator tube 21 the output of which may be suitably amplified as is well known to the art. The receiving circuit 20 is coupled to the conductor 1 through an input coil 22 which is energized by the modulated carrier current transmitted over the condenser 19 and a suitably tuned stop circuit or wave trap 23. The stop circuits 18 and 23 at the respective stations prevent interference between the transmitter and receiver at the station by blocking the high frequency oscillation of the transmitter at the station from the receiver at the same station while permitting the passage of the high frequency oscillations from the transmitter 8 or 12 at one station to the receiver 10 or 13 respectively at the other station. The receivers 10 and 13 are tuned to the frequencies of the carrier waves transmitted by the transmitters 8 and 12 respectively and in view of inherent variations in line conditions such as length of section, impedance and like factors the different circuit elements of the transmitters and receivers may be made adjustable to secure the desired tuning.

For modulating the carrier wave of the oscillator circuit in accordance with the output of the secondary of the current transformer of the station, a secondary circuit is provided with suitable means such as a resistance 24 which is also included in the grid circuit of the modulator tube 16 so that the potential on the grid will vary in accordance with the current in the circuit 1 at the station. The secondary circuit also includes one of the cooperating windings 25 of the directional relay at the station. The directional relays 11 and 110 may be of any suitable type examples of which are well known to the art.

In order that the transmitter and receiver at a station may be normally inactive, the secondary circuit may also include suitable electroresponsive means such as an overcurrent relay 27 arranged normally to complete a shunt circuit across the secondary of the current transformer through contacts 28 and upon the occurrence of a predetermined current in the circuit 1 to open the shunt circuit and close the circuit of the filament source 29 through contacts 30. The shunt circuit preferably includes a resistance 31 proportioned in accordance with the resistance of the relay winding 25 and the resistance 24 in order to prevent unstable operation of the relay 27 when the predetermined current occurs; that is, so that when the predetermined current occurs the relay 27 will pick up and stay up while the current remains at such predetermined value.

The output or modulated carrier wave of the transmitter at one station as rectified or demodulated and amplified, if desired, by the receiver at the adjacent station, is supplied to the cooperating winding 26 of the directional relay at the adjacent station. The demodulated carrier current may first be transformed by an intermediate transformer 32 having a winding in the plate or output circuit of the receiver and a winding in circuit with the directional relay winding 26. The purpose of the transformer 32 is to obtain better balance between the impedance of the receiver output circuit and the load circuit which includes the relay winding 26, that is, to match the tube impedance with the load impedance.

Although the contacts 33 of the directional relays 11 and 110 in the switch control circuits 34 which include the circuit breaker trip coils 35 can be arranged normally to be open and remain open on the occurrence of faults outside the protected section when the phase of the currents at the ends of the section 2—3 is substantially the same, I preferably arrange so that the contacts 33 are normally biased closed and remain closed on the occurrence of a fault within the section 2—3 but open on the occurrence of a through fault, that is outside of the section 2—3. By so doing proper protection is assured in case of failure of power flow into the section from both ends, breaking of the line conductor in the protected section and thus interrupting the carrier channel, if the line conductor is used, or failure of the carrier apparatus. If the directional relay contacts 33 are arranged as shown then I further add, in accordance with my invention, another electroresponsive device such as an overcurrent relay 36 whose contacts 37 are in series with the contacts 33 in the trip coil circuits and are normally open. In order to avoid unnecessary tripping, the relay 36 may be time delay in closing, the time delay being sufficient to allow for the time of opening of the directional relay contacts 33 so that the circuit breakers in a sound section will not be tripped in response to overcurrent alone unless because of failure of the directional relays to open the contacts. This feature thus provides an additional or back up protection.

Assuming normal line conditions, then if the overcurrent relays 27 are used, neither the transmitters 8 and 12 nor the receivers 10 and 13 will be operating. Upon the occurrence of an abnormal circuit condition causing a predetermined current in the stations, the relays 27 will operate and thus effect the operation of the transmitters and receivers. If the abnormal circuit condition is due to a through fault, the phase of the currents at the ends of the section 2—3 will be substantially the same and under these conditions the effect of the cooperating windings 25 and 26 of the directional relays will be such as to open the contacts 33. Consequently, the circuit breakers 5 and 6 will not be opened since their trip coil circuits will be open at the contacts 33 before the overcurrent relays 36 operate to close their contacts 37. If, however, the fault is within the section 2—3 and assuming that the system of which the circuit 1 is a part is such that the fault may be fed from both ends, that is, from stations 2 and 3, then the cooperating windings 25 and 26 exert an effect tending to maintain the contacts 33 closed since the currents at the stations now differ in phase. If a fault occurs on the section 2—3 but power is fed only from one end, say station 2, the winding 26 of the directional relay 110 will not be energized since no carrier current is transmitted from the station 3. Inasmuch as the contacts 33 of the relay 110 are biased to the closed position as shown, the circuit breaker 5 will be tripped in a time dependent on the operation of the overcurrent relay 36 at station 2. Obviously, if for any reason the transmitters or receivers fail to operate or the carrier channel, conductor 1 in the illustrated embodiment of my invention, becomes broken, a fault causing an overcurrent condition will result in opening one or both of the circuit breakers at the ends of the section 2—3 since one or both of the overcurrent relays 36 will respond and the directional relays will have their contacts 33 closed. It is to be noted that inasmuch as the operation of the directional relays is dependent solely upon the relative directions of the currents at the ends of the section 2—3, the fact that the transmitted carrier wave may not be a true measure of the magnitude of the current at the far end of the section, is immaterial. Nor does it matter on the occurrence of a through fault what the direction of the power flow may be.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. A protective system for an electric circuit including means at one point of the circuit for transmitting a carrier wave of a predetermined frequency and for modulating the carrier wave in accordance with a characteristic of the circuit at said point, means at another point of the circuit for demodulating said carrier wave and circuit controlling means including a directional relay having cooperating windings connected to be energized respectively in accordance with the demodulated carrier wave and a characteristic of the circuit at said other point.

2. A protective system for an electric circuit including means at one point of the circuit for transmitting a carrier wave of a predetermined frequency and for modulating the carrier wave in accordance with the circuit current at said point, means at another point of the circuit for demodulating the carrier wave and means for controlling the circuit in accordance with the relative directions of the circuit current at said points including a directional relay having two cooperating windings respectively connected to be energized in accordance with said demodulated carrier wave and the circuit current at said other point.

3. A protective system for an electric circuit including means at one point of the circuit for transmitting a carrier wave of a predetermined frequency and for modulating the carrier wave in accordance with the circuit current at said point, means at another point of the circuit for demodulating the carrier wave and means for controlling the circuit in accordance with the relative directions of the circuit current at said points and the magnitude of the circuit current of one of said points including a directional relay having two cooperating windings respectively connected to be energized in accordance with said demodulated carrier wave and the circuit current at said other point and a relay having a winding connected to be energized in accordance with the circuit current at said other point.

4. A protective system for an electric circuit including means at one point of the circuit for transmitting a carrier wave of a predetermined frequency and for modulating the carrier wave in accordance with the circuit current at said point, means at another point of the circuit for demodulating the carrier wave and means for controlling the circuit in accordance with the relative directions of the circuit current at said points and the magnitude of the circuit current at one of said points including a plurality of series connected means, a directional relay for controlling one of said means having two cooperating windings respectively connected to be energized in accordance with said demodulated carrier wave and the circuit current at said other point and a relay for controlling another of said means having a winding connected to be energized in accordance with the circuit current at said other point.

5. A protective system for an electric circuit including means at one point of the circuit for transmitting a carrier wave of a predetermined frequency and for modulating the carrier wave in accordance with the circuit current at said point, means at another point of the circuit for demodulating the carrier wave, means for controlling the circuit in accordance with the relative directions of the circuit current at said points and the magnitude of the circuit current at one of said points including a switch control circuit, a directional relay having normally closed contacts in said circuit and two cooperating windings respectively connected to be energized in accordance with said demodulated carrier wave and the circuit current at said other point and a time limit relay having normally open contacts in said control circuit and a winding connected to be energized in accordance with the circuit current at said other point.

6. A protective system for an electric circuit, including a high frequency transmitter arranged to have its output modulated in accordance with a characteristic of the circuit at one point thereof, a receiver at another point of the circuit tuned to the frequency of said transmitter and circuit controlling means including a directional relay having a winding connected to be energized by said receiver and a cooperating winding connected to be energized in accordance with a characteristic of the circuit at said other point.

7. In combination with an electric circuit and circuit controlling means therefor, means for controlling said circuit controlling means including a directional relay having a winding connected to be energized in accordance with the current at one point of the circuit and a cooperating winding arranged to be energized in accordance with the current at another point of the circuit, and means for effecting the energization of said cooperating winding in accordance with the current at said other point of the circuit including means for transmitting from said other point a carrier wave modulated in accordance with the current in the circuit at that point.

8. A protective arrangement for an alternating current circuit including current transformers associated with the circuit at separate points thereof and means for controlling the circuit in accordance with the phase relation between the currents in the circuit at said points including a normally inactive transmitter at one of said points adapted to transmit a carrier current having a predetermined frequency and modulated in accordance with the output of the current transformer at said point, a normally inactive receiver at another of said points adapted to demodulate said carrier current, means at each of said points operative in response to an abnormal condition to effect operation of the transmitter and receiver and a directional relay arranged to be controlled only in accordance with the phase relation between said demodulated carrier current and the output of the secondary of the current transformer at said other point.

9. A protective system for an alternating current circuit including current transformers associated with the circuit at separate points thereof, transmitting means at one of said points arranged to transmit a carrier current modulated in accordance with the potential across the secondary of the current transformer at said point, receiving means at another of said points adapted to demodulate said carrier current and a directional relay having a winding connected to be energized in accordance with the demodulated carrier current and a cooperating winding connected to be energized in accordance with the output of the current transformer at said other point.

In witness whereof, I have hereunto set my hand this 18th day of February, 1929.

ALAN S. FITZ GERALD.